United States Patent [19]

Sachs

[11] Patent Number: 5,996,062
[45] Date of Patent: Nov. 30, 1999

[54] METHOD AND APPARATUS FOR CONTROLLING AN INSTRUCTION PIPELINE IN A DATA PROCESSING SYSTEM

[75] Inventor: Howard G. Sachs, Belvedere, Calif.

[73] Assignee: Intergraph Corporation, Huntsville, Ala.

[21] Appl. No.: 08/751,273

[22] Filed: Nov. 18, 1996

Related U.S. Application Data

[63] Continuation of application No. 08/618,239, Mar. 21, 1996, abandoned, which is a continuation of application No. 08/414,142, Mar. 30, 1995, abandoned, which is a continuation of application No. 08/158,109, Nov. 24, 1993, abandoned.

[51] Int. Cl.⁶ ........................................................ G06F 9/38
[52] U.S. Cl. .......................... 712/215; 712/219; 711/203
[58] Field of Search ............................ 711/3, 118, 6, 711/140, 203–209; 395/800.23, 800.11, 376, 391, 705; 712/11, 23–25, 205, 213, 215, 219; 714/2, 15; 710/127

[56] References Cited

U.S. PATENT DOCUMENTS

| | | | |
|---|---|---|---|
| 4,920,477 | 4/1990 | Colwell et al. | 711/207 |
| 4,982,402 | 1/1991 | Beaven et al. | 714/15 |
| 5,027,270 | 6/1991 | Riordan et al. | 711/140 |
| 5,101,341 | 3/1992 | Circello et al. | 712/213 |
| 5,148,536 | 9/1992 | Witek et al. | 711/140 |
| 5,193,181 | 3/1993 | Barlow et al. | 714/2 |
| 5,197,133 | 3/1993 | Shen et al. | 712/219 |
| 5,226,133 | 7/1993 | Taylor et al. | 711/207 |
| 5,265,227 | 11/1993 | Kohn et al. | 711/207 |
| 5,307,506 | 4/1994 | Colwell et al. | 710/127 |
| 5,319,760 | 6/1994 | Mason et al. | 711/208 |
| 5,560,028 | 9/1996 | Sachs et al. | 712/23 |

*Primary Examiner*—John A. Follansbee
*Attorney, Agent, or Firm*—Townsend and Townsend and Crew LLP

[57] ABSTRACT

An address translation memory stores a plurality of virtual address tags. The virtual address tags typically designate a portion of the virtual address space corresponding to a page of data stored in an intermediate storage device. A portion of an input virtual address is used to address the translation memory, and the resulting output virtual address tag is compared to a relevant portion of the input virtual address. If they match, then the requested data resides in the intermediate storage device, and an instruction issuing unit allows the instructions to continue issuing to an instruction pipeline as scheduled. However, if the virtual address tag does not match the relevant portion of the input virtual address, then it is assumed that a page fault might occur, and the instruction issuing unit inhibits the issuance of further instructions to the instruction pipeline. A page table stored in the second storage memory is then accessed to determine whether in fact the page corresponding to the input virtual address is stored in the second storage device. If so, then the instruction issuing unit resumes issuing instructions to the instruction pipeline. If not, then the page corresponding to the input virtual address is retrieved from first storage device and communicated to the second storage device, and the instruction issuing unit resumes issuing instructions to the instruction pipeline.

25 Claims, 4 Drawing Sheets

METHOD AND APPARATUS FOR CONTROLLING AN INSTRUCTION PIPELINE IN A DATA PROCESSING SYSTEM

This is a Continuation of application Ser. No. 08/618,239, filed Mar. 21, 1996, now abandoned which is a continuation of Ser. No. 08/414,142 filed Mar. 30, 1995, now abandoned; and which is a continuation of Ser. No. 08/158,109 filed Nov. 24, 1993, now abandoned, the disclosure of which is incorporated by reference.

BACKGROUND OF THE INVENTION

The present invention relates to computing systems and, more particularly, to a method and apparatus for controlling multiple instruction pipelines.

Conventional sequential (non-pipelined, flow through) architecture computing systems issue program instructions one at a time and wait for each instruction to complete before issuing the next instruction. That ensures that the result value generated by each instruction is available for use by later instructions in the program. It also facilitates error recovery if an instruction fails to complete successfully and the program terminates abnormally. That is, since memory and register values are predictably altered in accordance with the sequence of program instructions, the problem may be corrected by restoring (backing up) the register values to the state that existed just prior to the issuance of the faulty instruction, fixing the cause of the abnormal termination, and then restarting the program from the faulty instruction. Unfortunately, these computing systems are also inefficient since many clock cycles are wasted between the issuance of one instruction and the issuance of the instruction which follows it.

Many modern computing systems depart from the sequential architectural model. A pipelined architecture allows the next instruction to be issued without waiting for the previous instruction to complete. This allows several instructions to be executed in parallel by doing different stages of the required processing on different instructions at the same time. For example, while one instruction is being decoded, the following instruction is being fetched, and the previous instruction is being executed. Even in a pipelined architecture, however, instructions still both issue and complete in order, so error recovery is still straight forward.

Even more advanced machines employ multiple pipelines that can operate in parallel. For example, a three pipeline machine may fetch three instructions every clock cycle, decode three instructions every clock cycle, and execute three instructions every clock cycle. These computing systems are very efficient. However, not all instructions take the same amount of time to complete, and some later-issued instructions may complete before instructions that issued before them. Thus, when a program terminates abnormally, then it must be determined which instructions completed before the faulty instruction terminated, and the memory and register values must be restored accordingly. That is a very complicated task and, if not handled properly, may eliminate many of the benefits of parallel processing.

One reason for instruction failure is the existence of logic or data errors which make it impossible for the program to proceed (e.g., an attempt to divide by zero). Another reason for instruction failure is an attempt to access data that is temporarily unavailable. This may occur if the computing system employs virtual addressing of data. As explained below, problems caused by virtual addressing are more difficult to overcome.

Figure 1:
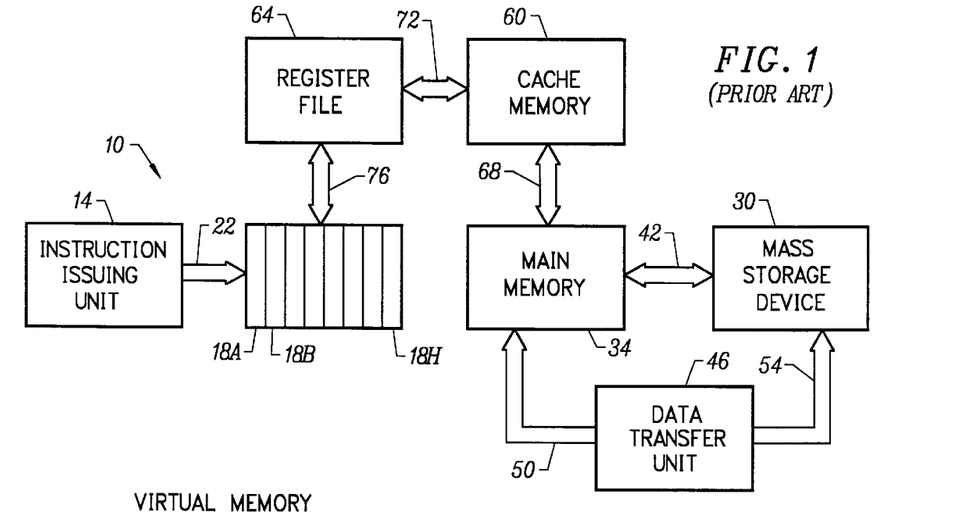
FIG. 1 is a block diagram of a known computing system.

FIG. 1 is a block diagram of a typical computing system 10 which employs virtual addressing. Computing system 10 includes an instruction issuing unit 14 which communicates instructions to a plurality of (e.g., eight) instruction pipelines 18A–H over a communication path 22. The data referred to by the instructions in a program are stored in a mass storage device 30 which may be, for example, a disk or tape drive. Since mass storage devices operate very slowly (e.g., a million or more clock cycles per access) compared to instruction issuing unit 14 and instruction pipelines 18A–H, data currently being worked on by the program is stored in a main memory 34 which may be a random access memory (RAM) capable of providing data to the program at a much faster rate (e.g., 30 or so clock cycles). Data stored in main memory 34 is transferred to and from mass storage device 30 over a communication path 42. The communication of data between main memory 34 and mass storage device 30 is controlled by a data transfer unit 46 which communicates with main memory 34 over a communication path 50 and with mass storage device 30 over a communication path 54.

Although main memory 34 operates much faster than mass storage device 30, it still does not operate as quickly as instruction issuing unit 14 or instruction pipelines 18A–H. Consequently, computing system 10 includes a high speed cache memory 60 for storing a subset of data from main memory 34, and a very high speed register file 64 for storing a subset of data from cache memory 60. Cache memory 60 communicates with main memory 34 over a communication path 68 and with register file 64 over a communication path 72. Register file 64 communicates with instruction pipelines 18A–H over a communication path 76. Register file 64 operates at approximately the same speed as instruction issuing unit 14 and instruction pipelines 18A–H (e.g., a fraction of a clock cycle), whereas cache memory 60 operates at a speed somewhere between register file 64 and main memory 34 (e.g., approximately two or three clock cycles).

Figure 2A:
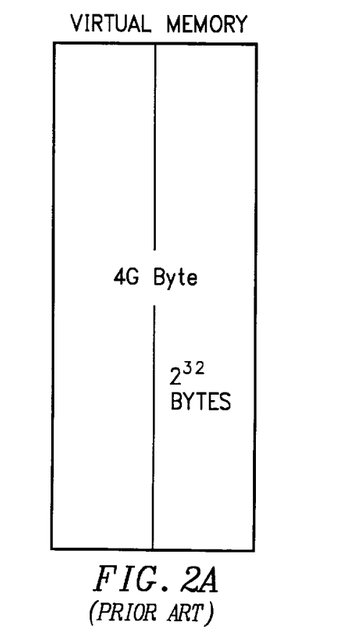
FIGS. 2A–B are diagrams illustrating virtual addressing.
Figure 2B:
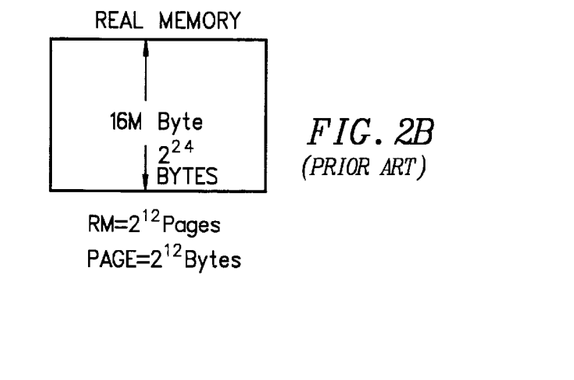

FIGS. 2A–B are block diagrams illustrating the concept of virtual addressing. Assume computing system 10 has 32 bits available to address data. The addressable memory space is then $2^{32}$ bytes, or four gigabytes (4 GB), as shown in FIG. 2A. However, the physical (real) memory available in main memory 34 typically is much less than that, e.g., 1–256 megabytes. Assuming a 16 megabyte (16 MB) real memory, as shown in FIG. 2B, only 24 address bits are needed to address the memory. Thus, multiple virtual addresses inevitably will be translated to the same real address used to address main memory 34. The same is true for cache memory 60, which typically stores only 1–36 kilobytes of data. Register file 64 typically comprises, e.g., 32 32-bit registers, and it stores data from cache memory 60 as needed. The registers are addressed by instruction pipelines 18A–H using a different addressing scheme.

To accommodate the difference between virtual addresses and real addresses and the mapping between them, the physical memory available in computing system 10 is divided into a set of uniform-size blocks, called pages. If a page contains $2^{12}$ or 4 kilobytes (4 KB), then the full 32-bit address space contains $2^{20}$ or 1 million (1 M) pages (4 KB×1 M=4 GB). Of course, if main memory 34 has 16 megabytes of memory, only $2^{12}$ or 4 K of the 1 million potential pages actually could be in memory at the same time (4 K×4 KB=16 MB).

Computing system 10 keeps track of which pages of data from the 4 GB address space currently reside in main memory 34 (and exactly where each page of data is physically located in main memory 34) by means of a set of page tables 100 (FIG. 3) typically stored in main memory 34. Assume computing system 10 specifies 4 KB pages and each page table 100 contains 1K entries for providing the location of 1K separate pages. Thus, each page table maps 4 MB of memory (1K×4 KB=4 MB), and 4 page tables suffice for a machine with 16 megabytes of physical main memory (16 MB/4 MB=4).

Figure 3:
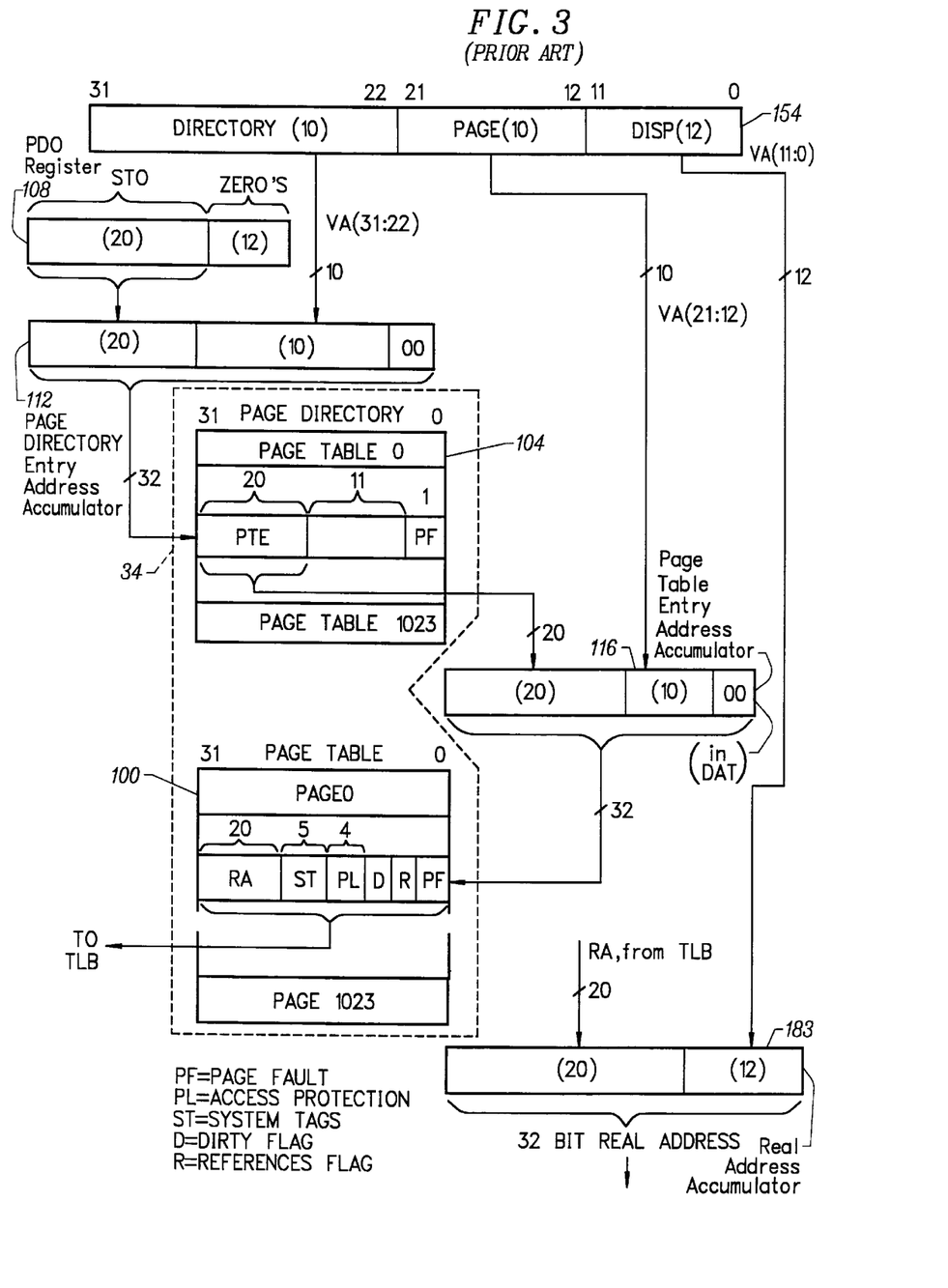
FIG. 3 is a diagram showing how page tables are accessed.

The set of potential page tables are tracked by a page directory 104 which may contain, for example, 1K entries (not all of which need to be used). The starting location of this directory (its origin) is stored in a page directory origin (PDO) register 108.

To locate a page in main memory 34, the input virtual address is conceptually split into a 12-bit displacement address (VA<11:0>), a 10-bit page table address (VA<21:12>) for accessing page table 100, and a 10-bit directory address (<VA 31:22>) for accessing page directory 104. The address stored in PDO register 108 is added to the directory address VA<31:22> of the input virtual address in a page directory entry address accumulator 112. The address in page directory entry address accumulator 112 is used to address page directory 104 to obtain the starting address of page table 100. The starting address of page table 100 is then added to the page table address VA<21:12> of the input virtual address in a page table entry address accumulator 116, and the resulting address is used to address page table 100. An address field in the addressed page table entry gives the starting location of the page in main memory 34 corresponding to the input virtual address, and a page fault field PF indicates whether the page is actually present in main memory 34. The location of data within each page is typically specified by the 12 lower-order displacement bits of the virtual address.

When an instruction uses data that is not currently stored in main memory 34, a page fault occurs, the faulting instruction abnormally terminates, and program control is transferred to the operating system. Thereafter, data transfer unit 42 must find an unused 4 KB portion of memory in main memory 34, transfer the requested page from mass storage device 30 into main memory 34, and make the appropriate update to the page table (indicating both the presence and location of the page in memory). The user program then may be restarted.

In a data processing system such as computing system 10, thousands of CPU cycles elapse from the time an instruction issues until the time it can be determined (by accessing page table 100) if the data requested by the instruction caused a page fault. Hence, if a page fault occurs, then it is necessary to back up the machine over many thousands of successfully completed instructions in order to resume execution at the point of the fault. As noted above, this is very difficult in machines that execute multiple instructions in parallel. Since page faults may occur very frequently depending upon the program, this results in substantial delay and unnecessary duplication of instruction execution.

SUMMARY OF THE INVENTION

The present invention is directed to a method and apparatus for preventing unnecessary backup operations in a computing system which executes multiple instructions in parallel. In general, a translation memory is used to determine if a page fault may occur in the system's main memory when an instruction is issued. If so, then the instructions which issued after that instruction are cancelled before they alter the contents of registers or memory. In this manner, the computing system simulates the sequential architectural model and remains in the same state it was at the time the faulting instruction issued.

More specifically, in one embodiment of the present invention, an address translation memory stores a plurality of virtual address tags. The virtual address tags typically designate a portion of the virtual address space corresponding to a page of data stored in a main memory or other intermediate storage device (e.g., they comprise the untranslated high order bits of a virtual address that corresponds to the translated real address). A portion of an input virtual address (e.g., the low order bits of the virtual address, the number of which is determined by the size of the translation memory) is used to address the translation memory, and the resulting output virtual address tag is compared to a relevant portion of the input virtual address (e.g., the higher order bits). If they match, then the requested data resides in the main memory device, and an issue control unit allows the instructions to complete as scheduled. However, if the virtual address tag does not match the relevant portion of the input virtual address, then it is assumed that a page fault will occur, and the issue control unit inhibits the issuance of further instructions to the instruction pipelines and cancels the instructions that issued since the faulting instructions (before those instructions alter the contents of registers or memory). A page table stored in the main memory device is then accessed to determine whether in fact the page corresponding to the input virtual address is stored in the main memory device. If so, then the issue control unit resumes issuing instructions to the instruction pipelines. If not, then the page corresponding to the input virtual address is retrieved from the mass storage device and communicated to the main memory device, and the issue control unit resumes issuing instructions to the instruction pipelines.

BRIEF DESCRIPTION OF THE PREFERRED EMBODIMENTS

Figure 4:
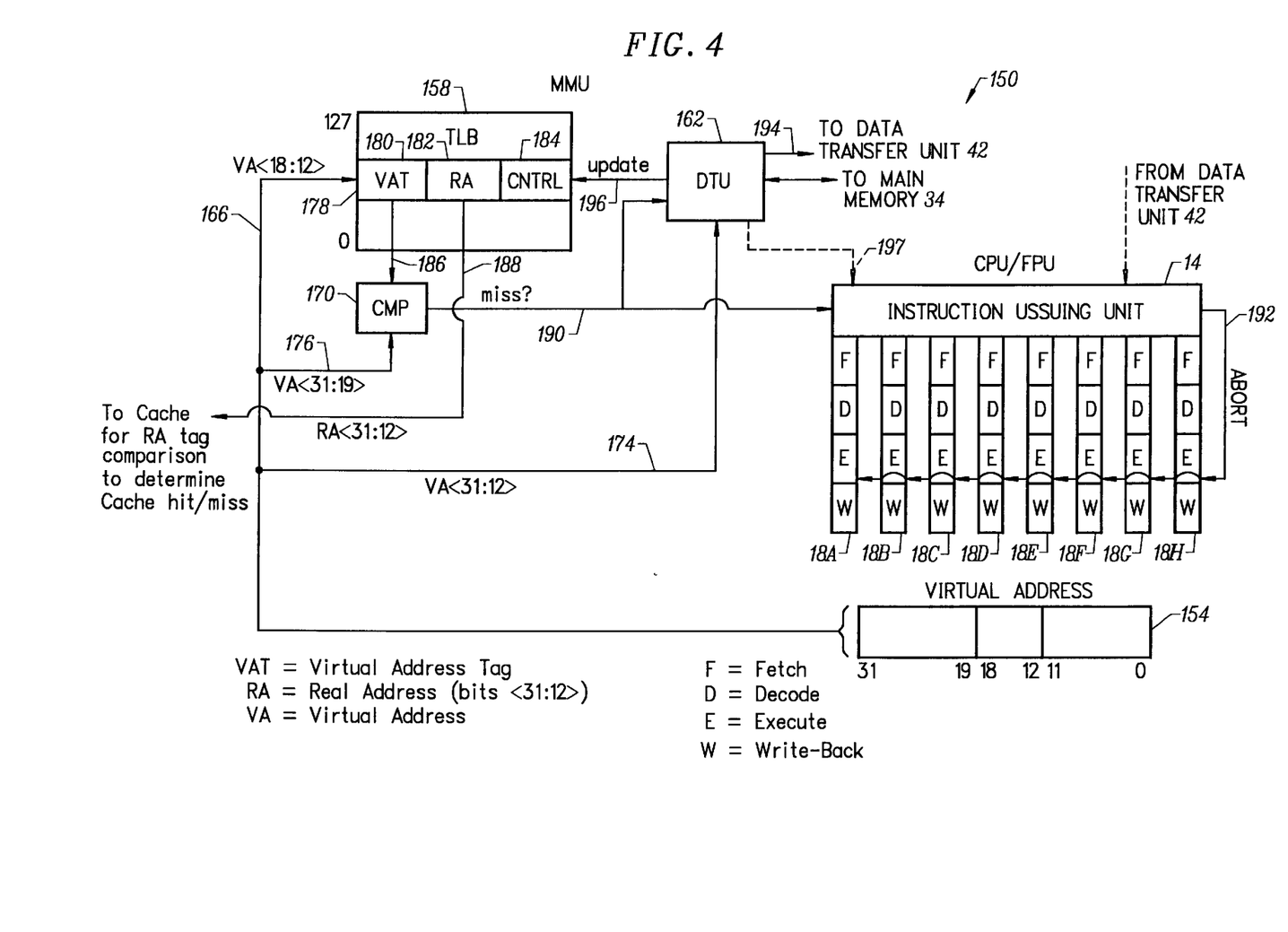
FIG. 4 is a block diagram of a particular embodiment of an apparatus according to the present invention for controlling the instruction pipelines of FIG. 1.

FIG. 4 is a block diagram of a particular embodiment of an apparatus 150 according to the present invention for controlling instruction pipelines 18A–H. Components which remain the same as FIGS. 1 and 3 retain their original numbering. Apparatus 150 includes an address register 154 for receiving an input virtual address which references data used by an instruction issued to one of instruction pipelines 14A–H, a translation memory (e.g., a translation lookaside buffer (TLB)) 158 and comparator 170 for initially determining whether data requested by the input virtual address resides in main memory 34, and a dynamic translation unit (DTU) 162 for accessing page tables in main memory 34. Bits VA[18:12] of the input virtual address are communicated to TLB 158 over a communication path 166, bits VA[31:12] of the input virtual address are communicated to DTU 162 over a communication path 174, and bits VA[31:19] are communicated to comparator 170 over a communication path 176.

TLB 158 includes a plurality of addressable storage locations 178 that are addressed by bits VA[18:12] of the input virtual address. Each storage location stores a virtual address tag (VAT) 180, a real address (RA) 182 corresponding to the virtual address tag, and control information (CNTRL) 184. How much control information is included depends on the particular design and may include, for example, access protection flags, dirty flags, referenced flags, etc.

The addressed virtual address tag is communicated to comparator 170 over a communication path 186, and the addressed real address is output on a communication path 188. Comparator 170 compares the virtual address tag with bits VA[31:22] of the input virtual address. If they match (a TLB hit), then the real address output on communication path 188 is compared with a real address tag (not shown) of a selected line in cache memory 60 to determine if the requested data is in the cache memory (a cache hit). An example of this procedure is discussed in U.S. Pat. No. 4,933,835 issued to Howard G. Sachs, et al. and incorporated herein by reference. If there is a cache hit, then the pipelines may continue to run at their highest sustainable speed. If the requested data is not in cache memory 60, then the real address bits on communication path 188 are combined with bits [11:0] of the input virtual address and used to obtain the requested data from main memory 34.

If the virtual address tag did not match bits VA[31:19] of the input virtual address, then comparator 170 provides a miss signal on a communication path 190 to DTU 162 and to instruction issuing unit 14. The miss signal indicates that the requested data is not currently stored in main memory 34, or else the data is in fact present in main memory 34 but the corresponding entry in TLB 158 has been deleted.

When the miss signal is generated, instruction issuing unit 14 cancels the instructions that issued after the instruction that generated the miss condition by providing an abort signal on a communication path 192 to the execute logic in each pipeline 18A–H. Instruction issuing unit 14 also inhibits further issuing of instructions to instruction pipelines 18A–H until the reason for the mismatch is resolved. In the meantime, DTU 162 accesses the page tables in main memory 34 to determine whether in fact the requested data is currently stored in main memory 34. If not, then DTU 162 instructs data transfer unit 42 through a communication path 194 to fetch the page containing the requested data from mass storage device 30. In any event, TLB 158 is updated through a communication path 196, and instruction issuing resumes.

Figure 5:
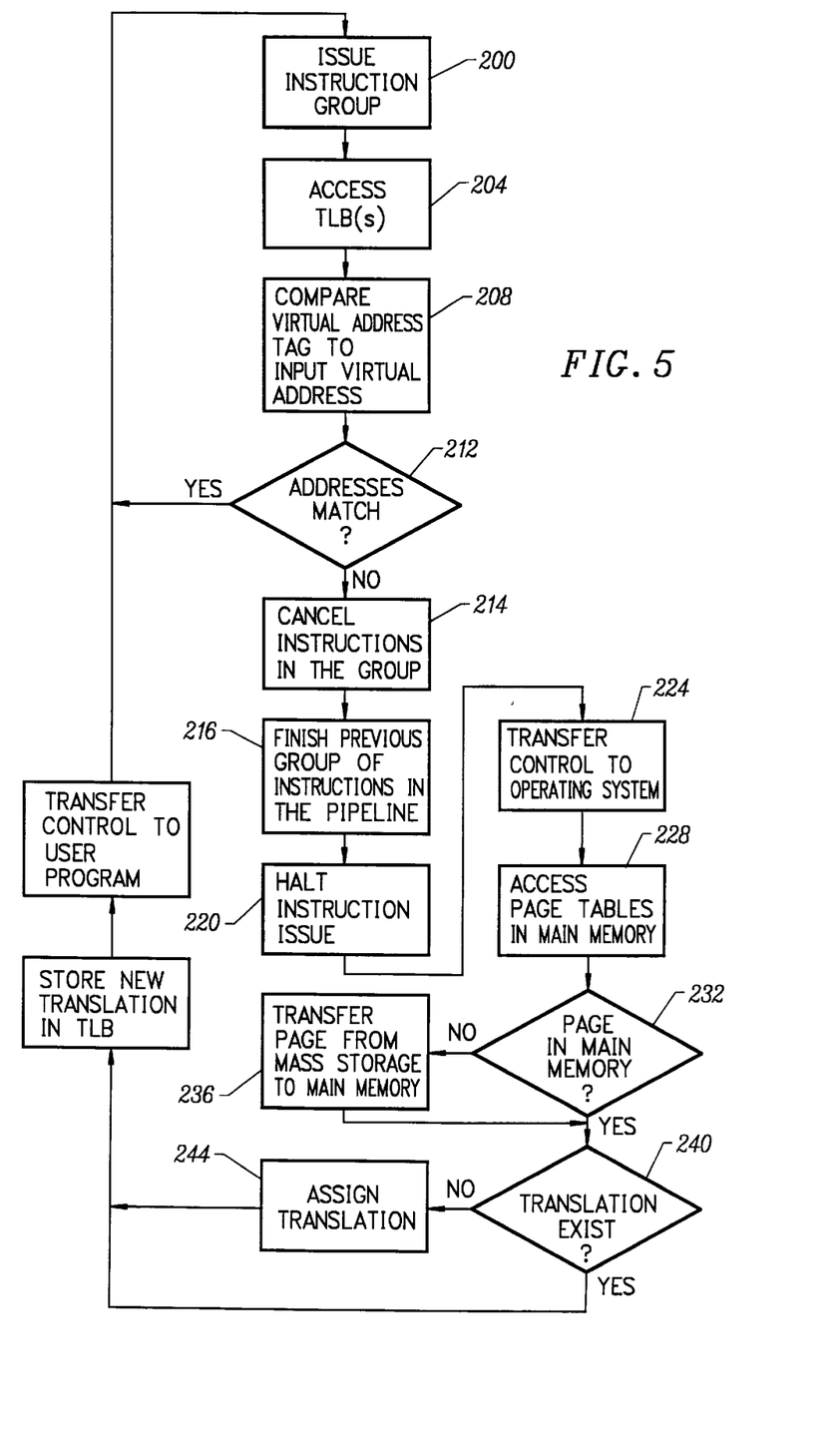
FIG. 5 is a flow chart of a particular embodiment of a method according to the present invention for controlling the instruction pipelines of FIG. 1.

FIG. 5 is a flow chart showing the operation of apparatus 150. When instruction issuing unit 14 issues a group of instructions to instruction pipelines 18A–H in a step 200, bits VA[18:12] of each input virtual address are used to address one of the storage locations 178 in TLB 158 in a step 204. The virtual address tag output from TLB 158 is compared to bits VA[31:19] of the corresponding input virtual address in a step 208, and it is ascertained in a step 212 whether the two addresses match. If so, then the requested data currently resides in main memory 34, and instruction issuing continues in step 200.

If the addresses do not match, then a miss signal is generated on communication path 190, instruction issuing unit 14 cancels the instructions in the current group in a step 214 (by preventing updating of the registers by any instructions in that group), allows the previous group of instructions in the pipeline to complete (and update the registers) in a step 216, and halts instruction issuing in a step 220. Program control is then transferred to the operating system in a step 224, whereupon DTU 162 accesses the page tables in main memory 34 (in the manner discussed above in conjunction with FIG. 3) in a step 228. Once the correct page table entry is located, it is ascertained in a step 232 (e.g., by examining the PF bit) whether the page containing the requested data is in fact currently stored in main memory 34. If not, then the requested page is transferred from mass storage device 30 to main memory 34 in a step 236. In any event, it is then ascertained in a step 240 whether a virtual-to-real address translation exists for the page in a step 240. If not, then a translation is assigned to the page in a step 244. Thereafter, TLB 158 is updated by storing bits VA[31:19] of the input virtual address together with bits [31:12] of the real address and any desired control information from the page table entry in the proper TLB storage location in a step 248, control is transferred to the user program in a step and instruction issuing resumes in step 200.

If the page table entry indicates that the page containing the requested data is not currently stored in main memory 34, then DTU 162 instructs data transfer unit 42 to transfer the page containing the requested data from mass storage 30 to main memory 34 in a step 232. TLB 158 is updated (as above) in step 228, and instruction issuing resumes in step 200.

While the above is a complete description of a preferred embodiment of the present invention, various modifications may be employed. For example, the issuing of each instruction could be held until a TLB hit signal is received from a previous instruction on communication path 190. Additionally, in the case of a TLB miss, instruction issuing could be held until TLB 158 is updated and a hit signal is provided on communication path 190, or else instruction issuing may resume as soon as it is determined that either the data already resides in main memory 34 (via a signal from DTU 162 on a communication path 197) or that the data is in the process of being communicated from mass storage 30 to main memory 34 (via a signal on communication path 197 or a signal from data transfer unit 42 on a communication path 198). Finally, multiple TLB's could be employed (one per load/store pipeline), with corresponding comparators and communication paths to instruction issuing unit 14 to effect the operations noted above whenever any of the TLB's generate a miss signal to instruction issuing unit 14. Consequently, the scope of the invention should be ascertained by the following claims.

What is claimed is:

1. An apparatus for controlling parallel instruction pipelines in a data processing system having a mass storage device for storing a first plurality of pages of data, the apparatus comprising:

a plurality of parallel instruction pipelines;

a translation lookaside buffer comprising:

address receiving means for receiving an input virtual address corresponding to data used by an instruction of a first plurality of parallel instructions, the input virtual address having a virtual address portion; and an address translator for outputting a virtual address tag and a real address in response to the input virtual address;

a comparator, coupled to the translation lookaside buffer for comparing the virtual address tag to the virtual address portion and for providing a table lookaside buffer miss signal when the virtual address tag does not match the virtual address portion;

a main memory coupled to the mass storage device for storing a second plurality of pages of data, wherein the second plurality is less than the first plurality, and for receiving the real address, the main memory including a page table for storing information indicating which pages of data from the mass storage device are stored in the main memory;

page table accessing means, coupled to the comparator and to the main memory, for accessing the page table in response to the table lookaside buffer miss signal;

page status indicating means, coupled to the page table accessing means, for indicating whether the page table shows that a page of data corresponding to the input virtual address is stored in the main memory; and an instruction issuing means coupled to the plurality of parallel instruction pipelines and to the comparator, for issuing the first plurality of parallel instructions and a second plurality of parallel instructions to the plurality of parallel instruction pipelines, the first plurality before the second plurality, and for cancelling the second plurality of parallel instructions from the plurality of parallel instruction pipelines in response to the table lookaside buffer miss signal, the instruction issuing means including reissuing means for reissuing the second plurality of parallel instructions to the plurality of parallel instruction pipelines when the page status indicating means indicates that the page table shows that the page of data corresponding to the input virtual address is stored in the main memory.

2. The apparatus according to claim 1, wherein the address translator comprises:

a translation memory for storing a plurality of virtual address tags and a plurality of real addresses at addressable storage locations therein; and addressing means, coupled to the address receiving means and to the translation memory, for addressing the translation memory with the input virtual address.

3. The apparatus according to claim 2, wherein the addressing means includes means for addressing the translation memory with a plurality of bits from the input virtual address less than a total number of bits in the input virtual address.

4. The apparatus according to claim 3 further comprising:

translation storing means, coupled to the translation memory and to the page status indicating means, for storing a virtual address tag and a real address in the translation memory when the page status indicating means indicates that the page table shows that the page of data corresponding to the input virtual address is stored in the main memory.

5. The apparatus according to claim 4, wherein the translation storing means stores a plurality of virtual address tags and a plurality of real addresses in the translation memory when the page of data corresponding to the input virtual address is communicated by a data transfer means to the main memory.

6. The apparatus according to claim 1 further comprising:

data transfer means, coupled to the mass storage device, the main memory and to the page status indicating means, for communicating the page of data corresponding to the input virtual address from the mass storage device to the main memory when the page status indicating means indicates that the page table shows that the page of data corresponding to the input virtual address is not stored in the main memory; and wherein the reissuing means reissues second plurality of parallel instructions when the page of data corresponding to the input virtual address is communicated to the main memory.

7. An apparatus for controlling parallel instruction pipelines in a data processing system having a mass storage device for storing a first plurality of pages of data comprising:

a plurality of parallel instruction pipelines;

a translation lookaside buffer comprising:

address receiving means for receiving an input virtual address corresponding to data used by an instruction of a first plurality of parallel instructions;

a translation memory for storing a plurality of virtual address tags and a plurality of real addresses at addressable storage locations therein;

addressing means, coupled to the address receiving means and to the translation memory, for addressing the translation memory with the input virtual address; and wherein the translation memory outputs a virtual address tag and a real address from a storage location addressed with the input virtual address by the addressing means;

a comparator, coupled to the translation lookaside buffer for comparing the virtual address tag to a portion of the input virtual address and for providing a table lookaside buffer miss signal when the virtual address tag does not match the portion of the input virtual address;

a main memory coupled to the mass storage device for storing a second plurality of pages of data, wherein the second plurality is less than the first plurality, the main memory including a page table for storing information indicating which pages of data from the first plurality of pages of data are stored in the main memory;

an instruction issuing means coupled to the plurality of parallel instruction pipelines and to the comparator for issuing the first plurality of parallel instructions and a second plurality of parallel instructions to the plurality of parallel instruction pipelines, the first plurality before the second plurality, and for cancelling the second plurality of parallel instructions from the plurality of parallel instruction pipelines in response to the table lookaside buffer miss signal;

page table accessing means, coupled to the comparator and to the main memory, for accessing the page table in response to the table lookaside buffer miss signal;

page status indicating means, coupled to the page table accessing means, for indicating whether the page table shows that a page of data corresponding to the input virtual address is stored in the main memory;

wherein the instruction issuing means includes reissuing means for reissuing the second plurality of parallel instructions to the plurality of parallel instruction pipelines when the page status indicating means indicates that the page table shows that the page of data corresponding to the input virtual address is stored in the main memory; and data transfer means, coupled to the mass storage device, to the main memory, and to the page status indicating means, for communicating the page of data corresponding to the input virtual address from the mass storage device to the main memory when the page status indicating means indicates that the page table shows that the page of data corresponding to the input virtual address is not stored in the main memory.

8. The apparatus according to claim 7 further comprising:

virtual address tag storing means, coupled to the translation memory and to the page status indicating means, for storing a virtual address tag and a real address in the translation memory when the page status indicating means indicates that the page table shows that the page of data corresponding to the input virtual address is stored in the main memory.

9. The apparatus according to claim 7, wherein the addressing means includes means for addressing the translation memory with a plurality of bits from the input virtual address less than a total number of bits in the input virtual address.

10. A method for controlling parallel instruction pipelines in a data processing system having a first storage device for storing a first plurality of pages of data, the method comprising:

storing information in a page table in a main memory indicating which of a first plurality of pages of data from a mass storage device are stored in the main memory;

issuing a first plurality of parallel instructions to a plurality of parallel instruction pipelines; thereafter issuing a second plurality of parallel instructions to the plurality of parallel instruction pipelines;

receiving an input virtual address corresponding to data used by an instruction from the first plurality of parallel instructions in an address receiver in a translation lookaside buffer, the input virtual address having a virtual address portion;

outputting a virtual address tag and a real address from an address translator in a translation lookaside buffer in response to the input virtual address;

comparing the virtual address tag to the virtual address portion in a comparator coupled to the translation lookaside buffer;

providing a table lookaside buffer miss signal when the virtual address tag does not match the virtual address portion;

canceling the second plurality of parallel instructions from the plurality of parallel instruction pipelines in response to the table lookaside buffer miss signal; and thereafter receiving the real address in the main memory;

accessing the page table in response to the table lookaside buffer miss signal;

indicating whether the page table shows that the page of data corresponding to the input virtual address is stored in the main memory; and reissuing the second plurality of parallel instructions to the plurality of instruction pipelines when the page table shows that the page of data corresponding to the input virtual address is stored in the main memory.

11. The method according to claim 10 wherein the address translator comprises a translation memory, and the method further comprises:

storing a plurality of virtual address tags and a plurality of real addresses at addressable storage locations in the translation memory.

12. The method according to claim 10 wherein outputting the virtual address tag includes addressing the translation lookaside buffer with the input virtual address.

13. The method according to claim 12 wherein addressing the translation memory includes:

addressing the translation lookaside buffer with a plurality of bits from the input virtual address less than a total number of bits in the input virtual address.

14. The method according to claim 13 further comprising:

storing a virtual address tag and a real address in the translation lookaside buffer when the page table shows that the page of data corresponding to the input virtual address is stored in the main memory.

15. The method according to claim 14 further comprising:

storing a plurality of virtual address tags and a plurality of real addresses in the translation lookaside buffer when the page of data corresponding to the input virtual address is communicated by a data transfer unit to the main memory.

16. The method according to claim 10 further comprising:

communicating the page of data corresponding to the input virtual address from the mass storage device to the main memory when the page tab shows that the page of data corresponding to the input virtual address is not stored in the main memory; and reissuing the second plurality of parallel instructions to the plurality of parallel instruction pipelines when the page of data corresponding to the input virtual address is communicated to the main memory.

17. A method for controlling a plurality of parallel instruction pipelines in a data processing system having a mass storage device for storing a first plurality of pages of data, the method comprising:

issuing a first plurality of parallel instructions to the plurality of parallel instruction pipelines; thereafter issuing a second plurality of parallel instructions to the plurality of parallel instruction pipelines;

receiving an input virtual address corresponding to data used by an instruction of the first plurality of parallel instructions in an address receiver in a translation lookaside buffer;

storing a plurality of virtual address tags and a plurality of real addresses at addressable storage locations in a translation memory;

addressing the translation memory with the input virtual address;

outputting a virtual address tag and a real address from an addressed storage location in the translation memory;

comparing the virtual address tag to a portion of the input virtual address in a comparator coupled to a translation lookaside buffer;

providing a table lookaside buffer miss signal when the virtual address tag does not match the portion of the virtual address;

canceling each of the first plurality and second plurality of parallel instructions from the plurality of parallel instruction pipelines in response to the table lookaside buffer miss signal; thereafter receiving the real address in a main memory, the main memory for storing a second plurality of pages of data, wherein the second plurality is less than the first plurality;

accessing a page table in the main memory, the page table for indicating which of the first plurality of pages of data are stored in the main memory in response to the table lookaside buffer miss signal;

indicating whether the page table shows that the page of data corresponding to the input virtual address is stored in the main memory; thereafter reissuing each of the first plurality of parallel instructions to the plurality of parallel instruction pipelines when the page table shows that the page of data corresponding to the input virtual address is stored in the main memory;

communicating the page of data corresponding to the input virtual address from the mass storage device to the main memory when the page table shows that the page of data corresponding to the input virtual address is not stored in the main memory; and thereafter reissuing each of the second plurality of parallel instructions to the plurality of parallel instruction pipelines when the page of data corresponding to the input virtual address is communicated to the main memory.

18. The method according to claim 17 further comprising:

storing a virtual address tag and a real address in he translation memory when the page table shows that the page of data corresponding to the virtual address is stored in the main memory; and storing the plurality of virtual address tags and the plurality of real addresses in the translation memory when the page of data corresponding to the input virtual address is communicated by a data transfer unit from the mass storage device to the main memory.

19. The method according to claim 17 wherein addressing the translation memory comprises:

addressing the translation memory with a plurality of bits from the input virtual address less than a total number of bits in the input virtual address.

20. An apparatus for controlling instruction pipelines in a data processing system having a mass storage device for storing a first plurality of pages of data, the apparatus comprising:

a plurality of parallel instruction pipelines an instruction issuing unit, for issuing a first and a second plurality of parallel instructions to the plurality of parallel instruction pipelines, the first plurality before the second plurality, for cancelling the first and second plurality of parallel instructions from each of the plurality of parallel instruction pipelines in response to a table lookaside buffer miss signal, and for reissuing the first and the second plurality of parallel instructions to the plurality of parallel instruction pipelines in response to a resume signal, each of the plurality of first and second plurality of parallel instructions having associated therewith an associated one of a plurality of input virtual addresses;

a main memory, for storing a second plurality of pages of data, the second plurality being less than the first plurality, the main memory including a page table for indicating whether a page of data that includes data addressed by a real address is stored in the main memory, the main memory for providing a page fault error when the page table indicates the page of data is not stored in the main memory, for providing the resume signal when the page table indicates the page of data is stored in the main memory, for storing the page of data and, for updating the page table to indicate the page of data is stored;

a data transfer unit, coupled to the mass storage device, to the main memory, and to the instruction issuing unit, the data transfer unit for transferring pages of data from the mass storage device to the main memory in response to the page fault error, and for providing the resume signal when the page table indicates that the page of data has been transferred from the mass storage device to the main memory;

a cache, coupled to the main memory, for storing a third plurality of pages of data, the third plurality being less than the second plurality, and for indicating whether the data addressed by the real address is stored within the cache;

a translation lookaside buffer coupled to the cache and coupled to receive the plurality of associated input virtual addresses for outputting a virtual address tag and the real address in response to each of the plurality of associated input virtual addresses; and a comparator coupled to the translation lookaside buffer and coupled to receive the plurality of associated input virtual addresses for comparing the virtual address tag for each of the plurality of associated input virtual addresses to a portion of each of the plurality of associated input virtual addresses, and for providing the table lookaside buffer miss signal when the virtual address tag for each of the plurality of associated input virtual addresses does not match the portion of each of the plurality of associated input virtual addresses.

21. The apparatus of claim 20 wherein each of the plurality of associated input virtual addresses are at least 32 bits long.

22. The apparatus of claim 20 wherein the translation lookaside buffer is also for storing the virtual address tag, the real address, and control data.

23. A method for controlling instruction pipelines in a data processing system having a mass storage device for storing a first plurality of pages of data, the method comprising:

issuing a first plurality of parallel instructions to a plurality of parallel instruction pipelines; thereafter issuing a second plurality of parallel instructions to the plurality of parallel instruction pipelines;

receiving an input virtual address corresponding to data used by an instruction of the first plurality of parallel instructions in an address receiver in a translation lookaside buffer;

addressing the translation look aside buffer with the input virtual address, the translation look aside buffer storing a plurality of virtual address tags and a plurality of real addresses at addressable storage locations;

outputting a virtual address tag and a real address from a storage location in the translation look aside buffer addressed by the input virtual address;

comparing the virtual address tag to a portion of the input virtual address in a comparator coupled to the translation lookaside buffer;

providing a table lookaside buffer miss signal when the virtual address tag does not match the portion of the input virtual address;

canceling the first and the second plurality of parallel instructions from the plurality of parallel instruction pipelines in response to the table lookaside buffer miss signal;

thereafter addressing a page table of a main memory with the real address in response to the table lookaside buffer miss signal;

indicating whether the page table shows that the page of data corresponding to the input virtual address is stored in the main memory;

providing a page fault error when the page table shows that the page of data corresponding to the input virtual address is not stored in the main memory;

transferring the page of data corresponding to the input virtual address from the mass storage device to the main memory in response to the page fault error;

reissuing the first and the second plurality of parallel instructions to the plurality of parallel instruction pipelines when the page table shows that the page of data corresponding to the input virtual address is stored in the main memory; and updating the translation look aside buffer to store the virtual address tag and the real address at the storage location addressed by the input virtual address.

24. The method of claim 23 further comprising:

storing the virtual address tag and the real address in the storage location in the translation lookaside buffer; and outputting the real address to a cache when the virtual address tag matches the portion of the input virtual address.

25. The method of claim 24 further comprising:

comparing the real address to a real address tag stored in the cache.

* * * * *